United States Patent Office 3,347,974
Patented Oct. 17, 1967

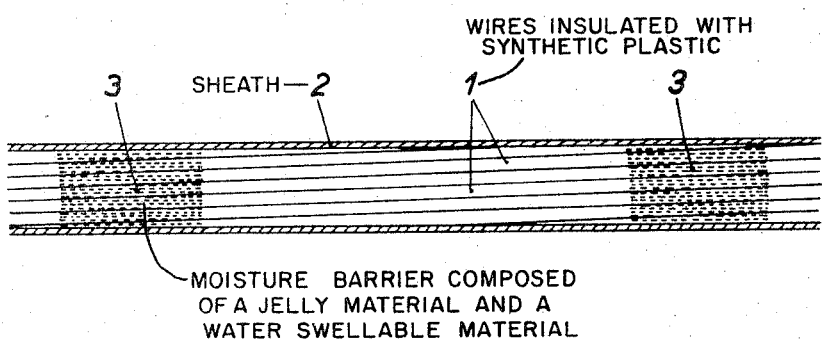

3,347,974
MOISTURE PROTECTION IN COMMUNICATION CABLES WHOSE CORES ARE COMPOSED OF CONDUCTORS INSULATED WITH SYNTHETIC PLASTIC, AND METHOD OF PRODUCING SUCH MOISTURE PROTECTION
Ilse Arendt and Heinz Puell, Berlin, Germany, assignors to Siemens & Halske Aktiengesellschaft, Berlin, Germany, a German corporation
Filed July 15, 1965, Ser. No. 472,204
Claims priority, application Germany, July 29, 1964, S 92,314; Apr. 26, 1965, S 96,764
5 Claims. (Cl. 174—23)

ABSTRACT OF THE DISCLOSURE

A communication cable having a core of conductors insulated with synthetic material and a sheath enveloping said core is protected against moisture. According to the invention, plugs or barriers are located axially along the length of the cable. These plugs are composed of a hydrophobic jelly material and a swelling medium. Moisture entering the cable causes the medium to swell completely filling the free cross-sectional area of the cable at the location of the plugs and preventing intrusion of moisture beyond that point. The invention also relates to the method of preparing said plugs.

Our invention relates to communication cables whose cores are composed of individual wires or other cable conductors and are enveloped by a protective sheath.

Damage to the sheath of such a cable may cause penetrating moisture to axially advance through the cable so that a relatively long length of the cable may be ultimately filled with water. This danger is particularly large with communication cables whose core conductors are insulated by synthetic plastic, as this material offers no resistance to advance of moisture.

It has become known, therefore, to protect communication cables of this kind by longitudinally spaced moisture barriers which are to limit any axial advance of water. In one of the known cables of this type, the interspaces between the individual conductors and the sheath are filled with plastic material at longitudinally spaced localities for limiting any ingress of water to the length of cable located between two such barriers. It has been found, however, that this cannot eliminate the trouble. For inserting the material, it must be highly heated. Consequently, its subsequent shrinking makes it infeasible to attain the required sealing action. The tightness of the plug thus inserted is further reduced by the fact that the inserted material cannot sufficiently follow variations in volume due to changes in temperature. The quality of the moisture seal obtainable by such plugs inserted into a cable in accordance with the known method is also impaired when subjecting the cable to bending as is required for laying or installing the cable.

Also known are moisture barriers in cables formed of polystyrene foam material. These barriers have the disadvantage of forming an air-tight closure in the cable relative to its longitudinal direction, so that it is no longer possible to supervise or control the pressure gas in such a cable.

It is an object of our invention to provide a moisture protection for communication cables with synthetically insulated cable conductors that reliably secures the desired limitation of longitudinal propagation of water but avoids the shortcomings of the known barriers by remaining unimpaired in the event of temperature variations or bending stresses and also preventing an air-tight longitudinal subdivision of the cable under normal operating conditions.

According to the invention, we provide the sheathed cable core with axially spaced barriers formed of respective quantities of swelling material which, when exposed to moisture increases its volume to a multiple of the normal, dry volume. By employing such a barrier material, a completely tight seal of the particular length of cable is secured by the occurring swelling if moisture or water penetrates into the cable as a result of damage to the sheath or other trouble. In contrast to the known moisture barriers, a barrier according to the invention commences to be effective only upon ingress of moisture or water and then causes the material to swell to such an extent that the seal is completely tight. On the other hand, this barrier effect is not impaired during the production of the cable, nor by temperature variations, or by bending of the cable during laying. Compared with the known moisture barriers of polystyrene foam, a barrier according to the invention has the advantage that the cable prior to occurrence of trouble, that is before moisture has penetrated into the cable core, is not air-tight in the longitudinal direction of the cable but remains permeable to air or other gas, so that pressure-gas supervision and control are applicable if desired.

It is preferable to provide moisture barriers according to the invention shortly ahead and/or shortly behind the junction sleeves of the cable, so that, in any event, a protection from moisture or water is secured for the sensitive sleeve contents. In some cases, it is also sufficient to provide a great length of cable with plugs of swelling material according to the invention only at localities closely adjacent to the sleeves. This has the advantage that the moisture protection according to the invention can be applied after manufacture of the entire length of cable by introducing the swelling materials from both ends into the length of cable.

It is often desirable to suitably identify the localities at which the quantities of swelling material are located in the cable. This is done, for example, by mixing traces of radioactive substances with the swelling material, or by admixing to the swelling material a small quantity of a substance which causes a light ferromagnetism detectable from the outside of the sheath.

The swelling material may be present within the cable in pulverulent or gel form. In this case, the swelling material is inserted into the cable with the aid of a binding medium during production of the cable. However, the swelling material may also consist at each plug locality of a multiplicity of elongated members such as filaments, threads, strands or foils. In this case, the moisture barriers are preferably produced by roping the swelling material together with the individual wires or conductors of the cable core during the cable manufacturing operation, or by spinning the swelling material, such as in the form of filaments or foils, onto the individual conductors of the core before they are all twisted together to form the core. Suitable for the purpose of the invention are all inorganic or organic substances capable of swelling in water. Bentonite, bentone, interlinked dextrines, starch, cellulose derivatives and alginates have been found to be particularly well suitable as swelling materials for the purpose of the invention.

The following examples of materials and barrier production methods have been found satisfactory.

A solution of methylcellulose in 1 to 4% concentration, dissolved in benzylalcohol (available under the trade name Tylose MB4000p from Kalle Aktiengesellschaft, Wiesbaden-Biebrich, Germany) is mixed with methylcellulose (obtainable from the same source under the trade designation Tylose MH4000p). The mixing is done by gradually adding the methylcellulose to the solution under continuous stirring until the solution turns into a gel-type mass of the desired consistency.

Also suitable is a suspension of 25% interlinked dextrin, 15% bentone and 60% methylalcohol. (The dextrin is available under the trade designation Sephadex from the company Pharmacia, Uppsala, Sweden.)

Another gel-type material suitable for the invention is obtained by adding to a highly viscous liquid solution of 5% polyvinylalcohol in water, an amount of 25% interlinked dextrin, starch, cellulose, alginate, bentonite or bentone.

Any of these gel-type materials is introduced into the cable core as it is being formed on the cabling machine. This is done by injection or extrusion. The gel-type material is applied each time to a length of about 5 cm., spacing the individual masses of material longitudinally from each other, for example a distance of 30 m. The amount of gel thus injected into the cable core should fill about 40% of the free volume in the core at each plug locality. After subsequently evaporating the alcohol or water, the core is sheathed in the conventional manner. A barrier locality thus produced is technologically fully equivalent to any other locality of the cable and also permits of pressure-gas application and supervision because a sufficient number of longitudinal gaps remain preserved. However, when water penetrates into any one of the plug localities, the substance swells within a few minutes to such an extent that the entire free space within the cable core at the plug locality is filled with a gel-type mass which prevents the further progress of water in the longitudinal direction for a sufficiently long period of time.

The accompanying drawing shows schematically an embodiment of a cable with longitudinally spaced moisture barriers according to the invention.

The core of the illustrated cable consists of mutually intertwisted wires 1 individually insulated with synthetic plastic. The core is tightly surrounded by a sheath 2 of aluminum which carries an external coating for protection from corrosion in the conventional manner. In accordance with the invention, a moisture barrier 3 is inserted at localities longitudinally spaced approximately 30 m. from each other. Each barrier consists of one of the above-exemplified paste-like materials which increases its volume several times by swelling when subjected to penetrated moisture. The barrier material may also be provided only at localities closely ahead or arrear of each cable sleeve, such as a junction sleeve or amplifier sleeve.

We have found it particularly convenient to provide the swelling material in pulverulent form. To facilitate introducing the pulverulent material, a jelly of paste is preferably employed which is not miscible with water and not soluble in water. This hydrophobic paste may be on a hydrocarbon and/or silicone base, similar to the petroleum jelly available under the trademark Vaseline. It is essential that the paste or jelly thus used for entering the swelling substance into the cable, form a colloidal system which is not varied by the influence of water or moisture. The swelling substance, used in pulverulent constitution, can be readily introduced with the aid of this jelly-like paste into the cable core. The dielectric properties of the cable are virtually not affected by the introduction of this Vaseline-like paste. Furthermore, in the event of bending stresses being imposed upon the cable as may occur during laying operations, such a paste always secures a sufficient coherence of the swelling substance within the cable core. In using such a paste, no components thereof must be eliminated after introducing the paste-powder mixture into the cable core. Furthermore, the paste improves the gliding ability or lubrication property of the material so that it can be readily introduced into the cable core by injection.

Suitable for the purpose just mentioned is a natural or synthetic jelly, i.e., a mixture of hydrocarbon oils and paraffins having a crystalline structure. In such a colloidal system, the hydrocarbon oils are built into the crystalline structure of the paraffins.

An example of the paste material just mentioned is composed of 95 parts paraffin oil having a viscosity of about 62 cp. at 50° C., and 5 parts highly dispersed silicic acid as available in the trade under the trade name Aerosil. This mixture is homogenized on a triple rolling stand to the constitution of a fat-like body which is thereafter mixed in a kneader with fine-granular interlinked dextrin in the ratio of 1:1 to 3:1. A suitable dextrin is available under the trade name Sephadex from the above-mentioned Pharmacia Company of Uppsala, Sweden. The grain size of the interlinked dextrin is approximately 10 to 100μ. After producing the cable core on the cabling or roping machine, the paste mixed in this manner with the swelling substance, is injected into the roped cable core by means of an injection-nozzle device.

When employing a jelly or paste of paraffin oil and highly dispersed silicic acid according to the above-mentioned example, it may occasionally happen that, after the mixture of paste and swelling substance has been injected into the cable core, some of the paraffin oil will ooze out. This is undesirable, although it does not impair the transmission qualities of the cable. To prevent such escape of paraffin oil, we have found it preferable to employ a petroleum jelly (Vaseline) as a gliding paste for introducing the pulverulent swelling material. Such a jelly is available in the trade, for example, under the name Petrolatum A from Esso (Humble Oil & Refining Company). This petroleum jelly is mixed in a kneader in the ratio of 1:2 with the fine granular interlinked dextrin, for example the above-mentioned Sephadex material. After cabling the core, the paste mixed with the swelling substance is injected into the core with an injector nozzle device. The paste mixed with the swelling material is thus placed along a length of approximately 5 cm., the individual localities being spaced approximately 30 m. from each other, for example. At each locality, approximately 40% of the free volume in the cable core is thus filled. If desired, the paste mixture may also be injected at the cable ends adjacent to cable sleeves so that the resulting plug localities are situated in the next adjacent cable section beneath the cable sheath.

As explained, when water penetrates into the cable core, the swelling substance contained in the core conjointly with carrier jelly, swells within a short interval of time and then occupies the entire space at the plug locality, thus preventing further penetration of moisture or water in the longitudinal direction of the cable. Tests have shown that barrier plugs produced in this manner in cables having a core of approximately 50 mm. composed of individual conductors insulated with synthetic plastic, exhibit a barrier effect relative to water which even after a period of about eight weeks has virtually not declined and remains still capable of withstanding a unilateral overpressure of at least 1 atmosphere (above atmospheric).

We claim:

1. A communication cable, comprising a core having conductors insulated with synthetic plastic, a sheath enveloping said core, and moisture barriers axially spaced in said core, said barriers being formed of a paste composed of a hydrophobic jelly material and a normally dry swelling medium having a multiple of its dry volume when exposed to moisture, said swelling medium filling only part of the free cross-sectional core space when dry and filling all of said space when moist.

2. In a communication cable according to claim 1, said swelling medium being in pulverulent form.

3. The method of providing moisture barriers in a communication cable having a sheathed core formed of conductors insulated with synthetic plastic, which comprises injecting between the cabled conductors of the core respective plugs of a paste composed of hydrophobic jelly material mixed with pulverulent swelling medium having a multiple of its dry volume when exposed to moisture, and spacing said plugs axially from each other.

4. The method according to claim 3, wherein said material is substantially a hydrocarbon-base jelly.

5. The method according to claim 3, wherein said material is substantially a silicone-base jelly.

References Cited

UNITED STATES PATENTS

| 452,341 | 5/1891 | Conner | 174—23 |
| 2,507,508 | 5/1950 | Elliott et al. | 174—23 X |

FOREIGN PATENTS

| 987,508 | 3/1965 | Great Britain. |

LEWIS H. MYERS, *Primary Examiner.*

H. HUBERFELD, *Assistant Examiner.*